United States Patent [19]

Komuro et al.

[11] Patent Number: 5,034,641
[45] Date of Patent: Jul. 23, 1991

[54] ROTARY MACHINES WITH PERMANENT MAGNET

[75] Inventors: Nobuaki Komuro, Tokyo; Yoshito Harui; Shoji Motodate, both of Saitama; Yukihiro Matsui, Kanagawa; Teruaki Tobita, Tokyo; Kouji Miyata, Fukui, all of Japan

[73] Assignees: Honda Giken Kogyo Kabushiki Kaisha; Shin-Etsu Chemical Co., Ltd., both of Tokyo, Japan

[21] Appl. No.: 471,956

[22] Filed: Jan. 26, 1990

[30] Foreign Application Priority Data

Feb. 13, 1989 [JP] Japan .................. 1-33309

[51] Int. Cl.$^5$ .............. H02K 1/17; H02K 21/28; H02K 23/04; H02K 1/12
[52] U.S. Cl. .................. 310/154; 310/152; 310/254
[58] Field of Search ............ 310/152, 154, 155, 254, 310/258; 335/297

[56] References Cited

U.S. PATENT DOCUMENTS

| 4,243,903 | 1/1981 | Mishima | 310/154 |
| 4,283,647 | 8/1981 | Herr et al. | 310/154 |
| 4,453,097 | 6/1984 | Lordo | 310/154 |
| 4,469,969 | 9/1984 | Tomite | 310/154 |
| 4,508,988 | 4/1985 | Reiss et al. | 310/154 |
| 4,574,214 | 3/1986 | Fujisaki | 310/154 |
| 4,774,426 | 9/1988 | Mohr et al. | 310/154 |

FOREIGN PATENT DOCUMENTS 2748162  5/1979  Fed. Rep. of Germany ...... 310/154

Primary Examiner—Steven L. Stephan
Assistant Examiner—C. LaBalle
Attorney, Agent, or Firm—Wenderoth, Lind & Ponack

[57] ABSTRACT

The invention relates to an improvement in the design of the magnetic circuit in a permanent-magnet rotary machine, e.g., a servomotor, with an object to stabilize the output of the motor with respect to temperature variation. The inventive improvement is in making the value of $(A_m B_m)/(A_y B_{ys})$, which is called the area factor $\alpha$, larger than 1 but smaller than 5, $A_m$ and $B_m$ being the cross sectional area and magnetic flux density, respectively, in the magnetic circuit of the permanent magnet and $A_y$ and $B_{ys}$ being the effective cross sectional area and saturation magnetic flux density at room temperature, respectively, in the magnetic circuit of the yoke.

5 Claims, 3 Drawing Sheets

ROTARY MACHINES WITH PERMANENT MAGNET

BACKGROUND OF THE INVENTION

The present invention relates to an improvement in a rotary machine, such as electric motors and power generators, with a permanent magnet and, more particularly, to an improvement in a compact-size rotary machine comprising one or more of permanent magnets, a yoke and an armature.

A typical structure of a conventional servomotor, which is a kind of permanent-magent rotary machine, is schematically illustrated in FIGS. 1a and 1b by an axial and a radial cross section, respectively, in which a pair of upper and lower permanent magents 2 and 3 are held symmetrically by the yoke 4,5 each facing the armature 1 rotatable around the shaft 7. The magnetic flux Φ forms a loop passing through the "armature 1→ upper permanent magnet 2→ yoke 4,5→ lower permanent magnet 3→ armature 1". Assuming that the cross sectional area and magnetic flux density in the magnetic circuit of the permanent magnets 2 and 3 are given by $A_m$ and $B_m$, respectively, and the cross sectional area and magnetic flux density in the magnetic circuit of one of the wings of the yoke 4,5 are given by $A_y/2$ and $B_y$, respectively, then the following equation sets forth the relationship of these parameters:

$$(1/a) \times A_m \times B_m = (A_y/2) \times B_y \times 2 = A_y \times B_y, \quad (I)$$

in which α is an area factor which usually has a value smaller than 1 in order not to magnetically saturate the yoke 4,5.

When an electric current is passed through each of the armature coils 6, the shaft 7 is rotated with a torque proportional to the magnetic flux. Since the magnetic flux Φ is a function of temperature, however, the output of the motor will not always be constant. For example, the output is decreased as a result of a decrease in the magnetic flux Φ when the temperature of the motor is increased by the heat evolved from the armature coils 6 or by an increase in the ambient temperature. The instability of the output of the motor is rather great when ferrite magnets, rare earth-based magnets and the like are used as the permanent magnets 2 and 3 since these parmanent magnets have relatively large temperature coefficients of their magnetic flux.

Accordingly, it is eagerly desired to develop a means to improve a permanent-magnet rotary machine with respect to the stability of the output in relation to the temperature variation even when ferrite magnets, rare earth-based magnets and the like are used as the permanent magnets.

SUMMARY OF THE INVENTION

The present invention accordingly has an object to provide a simple and reliable means for the improvement stabilization of the output of a permanent-magent rotary machine in relation to temperature variation.

To this end, the present invention provides an improvement in a permanent-magnet rotary machine comprising a permanent magnet, yoke and armature, which has a value larger than 1 but smaller than 5 of the area factor α in the equation $$A_y = (1/a) \times (A_m B_m / B_{ys}).$$

in which $A_m$ and $B_m$ are the cross sectional area and the magnetic flux density at room temperature, respectively, in the magnetic circuit of the permanent magnet and $A_y$ and $B_{ys}$ are the effective cross sectional area and the saturation magnetic flux density at room temperature, respectively, of the magnetic circuit of the and from which a can be represented as:

$$a = A_m B_m / A_y B_{ys}$$

DETAILED DESCRIPTION OF THE PREFERRED EMBODIMENTS

Figure 1A:
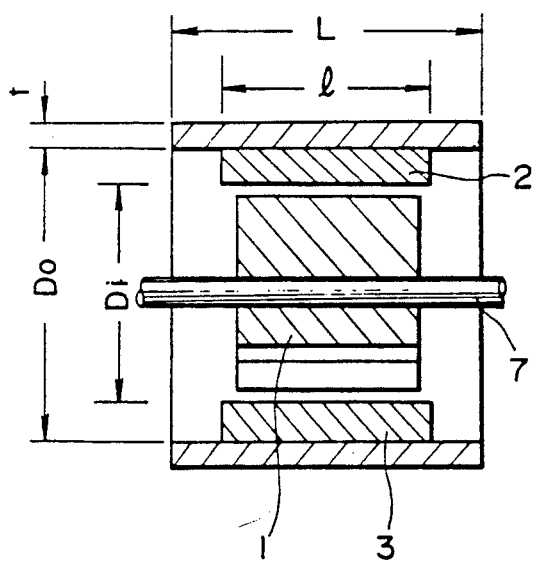
FIGS. 1a and 1b are each a schematic illustration of axial and radial cross sections, respectively, of a servomotor.
Figure 1B:
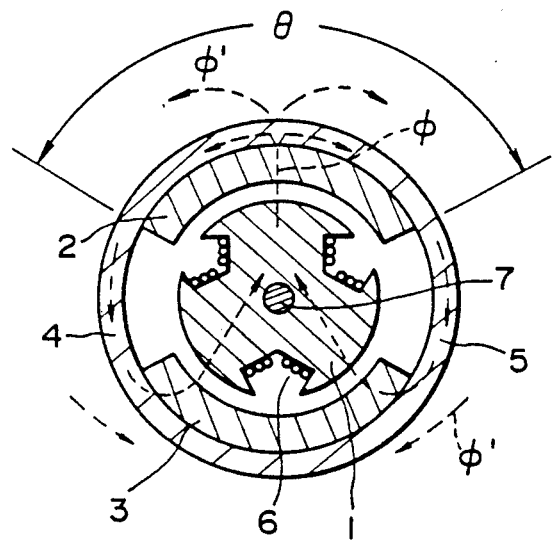

In the following, the improvement of the present invention is described in detail with reference to FIGS. 1a and 1b schematically illustrating a permanent-magnet rotary machine, such as a servomotor, with cross sections which are substantially the same as in the conventional machines and the machines according to the inventive improvement in so far as the basic structure is concerned.

According to the figures, the values of the above mentioned $A_m$ and $A_y/2$ can be calculated from the following equations:

$$A_m = \pi \times (D_o + D_i)/2 \times \Theta/360 \times l; \text{ and}$$

$$A_y/2 = t \times L,$$

in which $D_i$ is the diameter of the circle circumscribed by the inner peripheries of the upper and lower permanent magnets 2 and 3, $D_o$ is the diameter of the circle circumscribed by the outer peripheries of the upper and lower permanent magnets 2 and 3, Θ is the angle in degree around the shaft 7 subtended by the arc through which each of the upper and lower permanent magnets 2 and 3 extends around the shaft 7, l is the length of each of the upper and lower permanent magnets 2 and 3 in the axial direction, L is the length of the yoke 4,5 in the axial direction and t is the thickness of the yoke 4,5. It is usual that L is not smaller than l.

When the effective cross sectional area $A_y$ of the yoke 4,5 is decreased, the magneetic flux density $B_y$ in the yoke 4,5 is increased and finally reaches the saturation magnetic flux density $B_{ys}$ which is a constant determined by the material of the yoke 4,5. The magnetic flux density $B_y$ in the yoke 4, 5 remains even when by further decreasing the $A_y$ so that the leakage magnetic flux Φ, is increased a certain amount. Accordingly, at saturation magnetic flux density Bys, the equation (I) can be written in the form of $$A_y = (1/a) \times (A_m B_m / B_{ys}).$$

As is understood from this equation, the area factor α is inversely proportional to $A_y$ or increases as the degree of saturation in the yoke 4,5 is increased. When the effective cross sectional area $A_y$ of the yoke 4,5 is selected to have a value such that the magnetic flux density in the yoke $B_y$ is equal to $B_{ys}$ with the value of the area factor $\alpha$ larger than 1 at room temperature, a decrease in the magnetic force of the permanent magnets 2,3 as a consequence of the temperature elevation in the motor in service first causes a decrease in the leapage magnetic flux $\Phi'$ keeping the magnetic flux density $B_y$ little changed from the saturation value $B_{ys}$ so that the magnetic flux through ther armature 1 is little affected. Consequently, the output of the motor is stabilized with respect to the variation in the temperature.

The chacteristic feature of the inventive improvement consists in that the magnetic flux in the permanent magnet $A_m B_m$ is larger than the magnetic flux $A_y B_{ys}$ in the yoke by a factor $\alpha$ which is called the area factor. The value of $\alpha$ is larger than 1 but smaller than 5 or, preferably, in the range from 1.25 to 2.0. A too large value of $\alpha$ means that a large portion of the magnetic flux obtained by the permanent magnets is lost as the leakage magnetic flux or that the permanent magnets are futilely large or powerful which causes economical disadvantages. When the value of $\alpha$ is too small, on the other hand, the stabilizing effect against temperature variation is not fully achieved. Since the value of $\alpha$ is inversely proportional to $A_y$ assuming the other parameters are equal, the desired value of $\alpha$ can be obtained by adequately selecting the value of $A_y$ by modification of the dimensions t, L and the like of the yoke 4,5.

Figure 2:
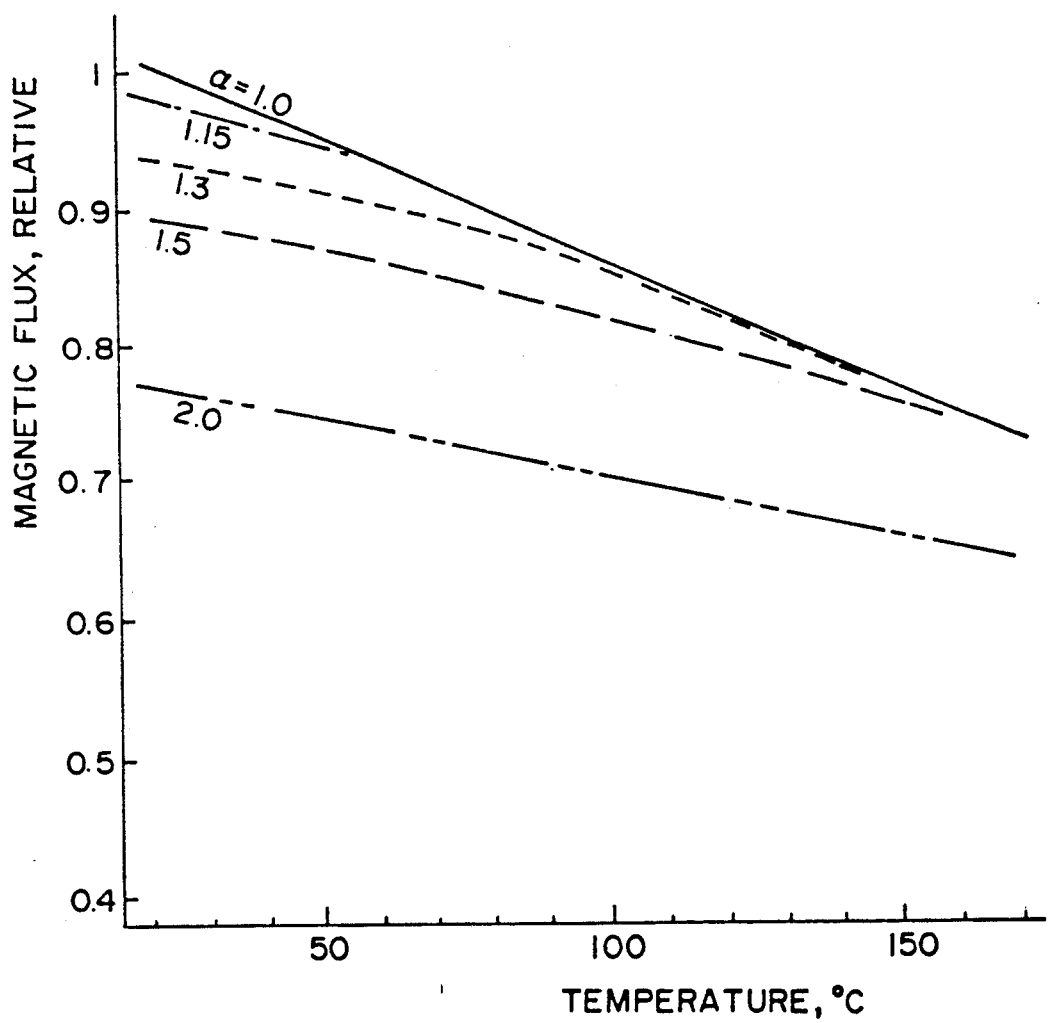
FIG. 2 is a graphic showing of the values of the magnetic flux as a function of temperature with the value of α as a parameter.

FIG. 2 of the accompanying the drawing graphically shows the magnetic flux in a yoke made by using a ferrite magnet previous a temperature coefficient of the magnetic flux of $-0.18\%/°C.$, as the permanent magnet as the function of the temperature with $\alpha$ as a parameter was varied from 1.0 to 2.0. As is clear from this figure, the decrease in the magnetic flux was smaller when the value of $\alpha$ was larger. Each of the curves for the values of $\alpha$ equal to 1.15, 1.3, 1.5 and 2.0 converges to the curve with $\alpha = 1.0$ as the temperature is increased.

Figure 3:
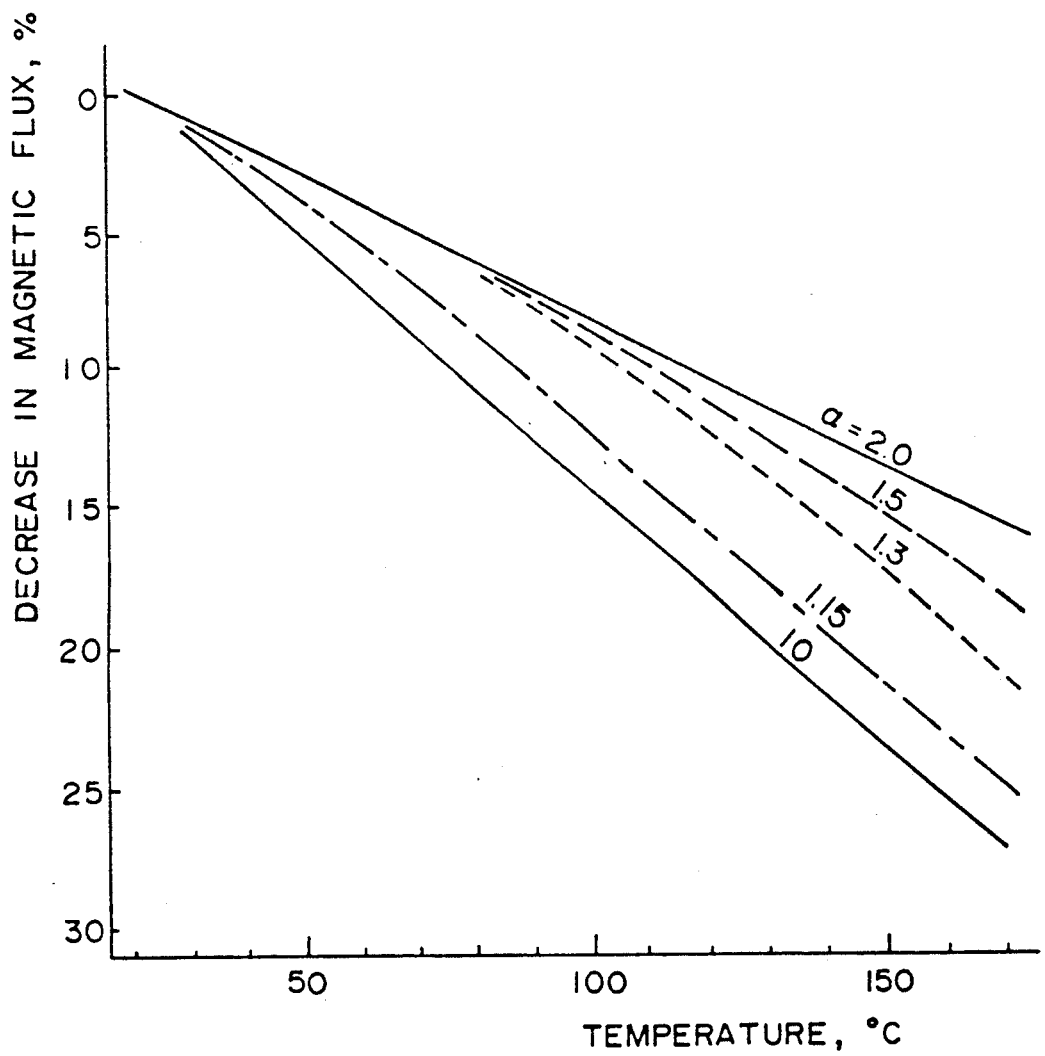
FIG. 3 is a graphic showing of the % decrease in the magnetic flux derived from FIG. 2 as the temperature is increased with the value of α as a parameter.

FIG. 3 shows the % decrease in the magnetic flux from the value at room temperature as a function of the temperature with $\alpha$ as a parameter as calculated from the data shown in FIG. 2. When $\alpha$ was equal to 1.0, the temperature coefficient of the magnetic flux was $-0.18\%/°C.$ in the temperature range from 20° to 150° C., which was approximately idential with the temperature coefficient of the ferrite magnet per se. When $\alpha$ was equal to 1.5, the temperature coefficient was $-0.117\%/°C.$ to ensure a great improvement in the stability of the output of the motor with respect to temperature variation.

When a neodymium-based rare-earth magnet, which had a temperature coefficient of the magnetic flux of $-0.12\%/°C.$, was used in place of the ferrite magnet used above, the temperature coefficient of the magnetic flux in the yoke was $-0.13\%/°C.$ and $-0.058\%/°C.$ with the value of $\alpha$ equal to 1.0 and 1.4, respectively, indicating a similar improvement in the stability.

What is claimed is:

1. In a rotary machine with a permanent magnet, said rotary machine having a magnetic circuit having a permanent magnet, a yoke and an armature, and the cross-sectional area and magnetic flux density at room temperature along the part of a flux path of the magnetic circuit which is in the magnet are Am and Bm, respectively, and the cross-sectional area and saturated magnetic flux density at room temperature along the part of the flux path of the magnetic circuit which in the yoke are Ay and Bys, respectively, said cross-sectional areas and flux densities being in teh relation:

$$Ay = (1/a) \times (Am\ Bm/Bys)$$

and in which a is an area value, the improvement in which a has a value larger than 1 and smaller than 5.

2. The improvement as claimed in claim 1 wherein the area factor $\alpha$ has a value in the range from 1.2 to 2.0.

3. The improvement as claimed in claim 1 wherein the permanent magnet is a ferrite-based permanent magnet.

4. The improvement as claimed in claim 1 wherein the permanent magnet is a rare earth-based permanent magnet.

5. The improvement as claimed in claim 4 wherein the rare earth-based permenant magnet is a neodymium-containing rare earth-based permenant magnet.

* * * * *